Jan. 28, 1941. G. S. MOORE ET AL Re. 21,701

CENTRIFUGAL SWITCH

Original Filed Feb. 21, 1938 2 Sheets-Sheet 1

Inventor
Giles S. Moore
Elmer D. Streetfuss

By N. Yates Douglas
Attorney.

Jan. 28, 1941. G. S. MOORE ET AL Re. 21,701

CENTRIFUGAL SWITCH

Original Filed Feb. 21, 1938 2 Sheets-Sheet 2

Inventor

Giles S. Moore

Elmer G. Streckfuss

By

A. Yates Dowell

Attorney

Reissued Jan. 28, 1941

Re. 21,701

UNITED STATES PATENT OFFICE 21,701

CENTRIFUGAL SWITCH

Giles S. Moore and Elmer G. Streckfuss, Indianapolis, Ind., assignors to G. B. M. Electric Company, Inc., Indianapolis, Ind., a corporation of Indiana Original No. 2,128,841, dated August 30, 1938, Serial No. 191,784, February 21, 1938. Application for reissue August 30, 1940, Serial No. 354,900

10 Claims. (Cl. 200—80)

This invention relates to electrical switches broadly and is particularly concerned with switches of the governor-controlled type generally used with signal and like circuits wherein a plurality of signals, such as lights or audible sounding devices, are adapted to be electrically energized in successive order, such for example as the electric speedometer-odometer-signal system disclosed in the copending application of Giles S. Moore, Serial No. 190,492 filed February 14, 1938.

Commercial production of the foregoing type of switch units involve problems which are not apparent in experimental units. Each group of signals generally calls for a differently timed switch, and since certain tolerances must be made for governor springs, the contact bank must also be adjusted to compensate for certain variations in strength of the spring. Hence, if accuracy is to be maintained, the switch bank must be set or timed not only in accordance with the stepped signals but also in accordance with variation in the governor action of the respective units.

An important object of the present invention, therefore, is to provide a switch of the stepped-signal, governor-controlled type embodying a bank of contacts so constructed as to be readily adjustable to time the switch in accordance with the signals with which it may be associated and also to compensate for variation in the actuating parts of the switch.

Another object of the invention is to provide a switch unit of the type specified having a multiple of contacts arranged to be contacted in successive order by a movable switch member, such as a common conductor brush, the said contacts being unusually compact and permanently braced against displacement due to shocks and jars incident to the travel of the vehicle or other objects to which the signal system may be applied.

Another object of the invention is to provide a switch of the multiple contact, governor-controlled type having a movable switch arm carrying a brush which is energized from a relatively stationary member to which the common conductor is connected, thereby eliminating the necessity of insulating the governor actuated switch arm and permitting use of metal parts at points where a bearing action takes place.

Another object of the invention is to provide a multiple contact, governor-controlled switch wherein the respective contacts which make up the bank consist of flat segments so arranged that their edges only are wiped by the common conductor brush, thereby permitting a secure and compact unit in which any chance of sticking or bending during service is eliminated and insuring maximum life to the switch unit in general.

Further objects are: to generally improve and render more durable switch units of the multiple contact type, to provide a switch unit which may be manufactured in volume and at a relatively low cost, and to generally simplify and render more durable switches of this type.

The foregoing and other objects and advantages will become apparent in view of the following description taken in conjunction with the drawings, wherein.

Figure 2:
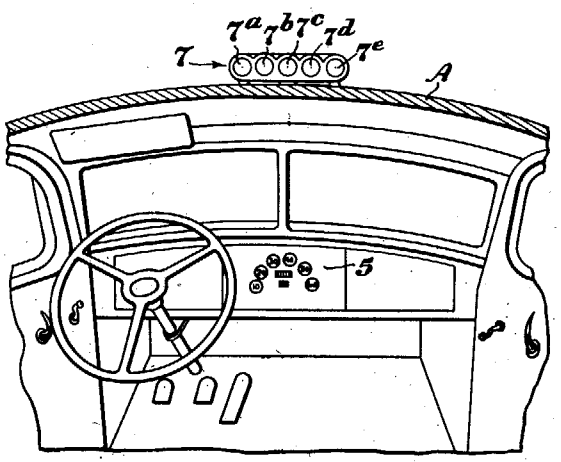
Fig. 2 is a transverse sectional view taken through the driver's compartment of Fig. 1.
Figure 1:
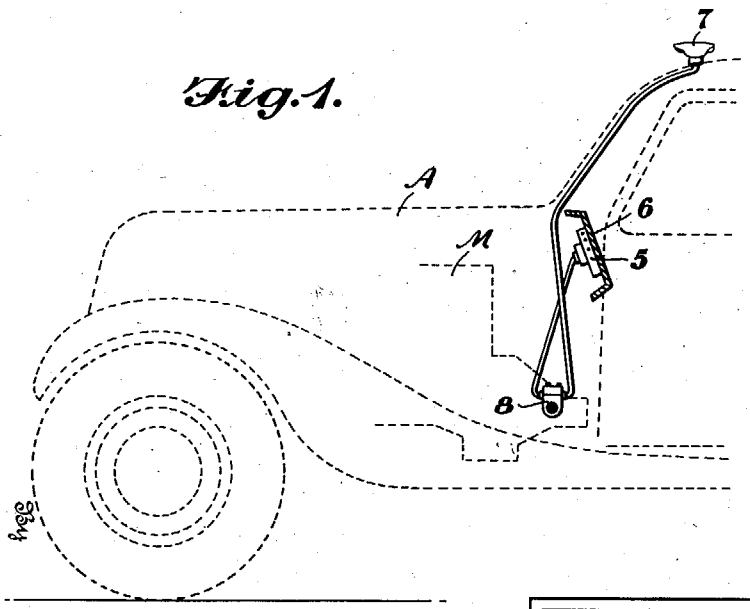
Fig. 1 is a phantom view in sectional side elevation of the front portion of a motor vehicle, illustrating the improved switch operatively installed in conjunction with an electric speedometer-odometer-signal unit.

Figs. 1 and 2 illustrate a signal system for vehicles of that type wherein a bank of signal lights indicating stepped mileages are mounted exteriorly of the vehicle, and another bank, namely, a speedometer bank, are mounted on the interior of the vehicle to indicate a speed of travel of the latter. The system illustrated also includes diagrammatically an electrically driven odometer. These units call for a switch of the multiple contact type having a multiple switch member adapted to wipe the contacts in direct relation to the speed of travel of the vehicle.

In Figs. 1 and 2, the vehicle is generally indicated at A and may be powered by the conventional internal combustion engine at dotted outline which is indicated at M. A speedometer is generally indicated at 5 and embodies a series of lights 5a, 5b, 5c, 5d, 5e and 5f. On the top of the vehicle is a bank of signal lights generally indicated at 7 and embodying a plurality of lights 7a, 7b, 7c, 7d and 7e. The speedometer casing is mounted on the conventional panel board 6.

Figure 4:
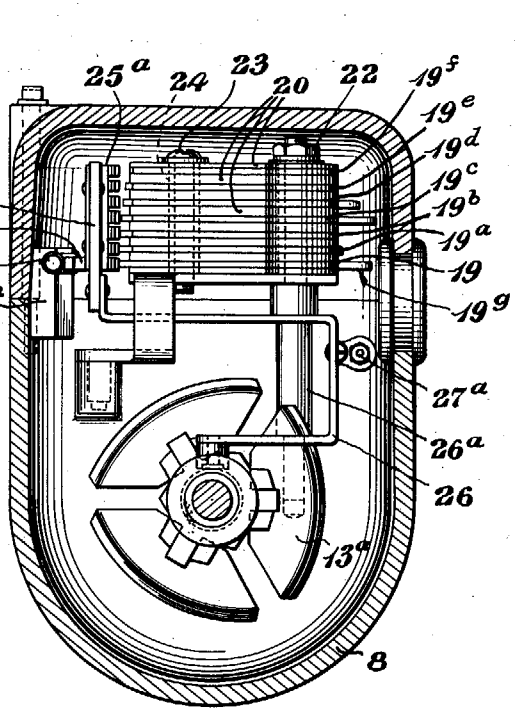
Fig. 4 is a view in section and end elevation taken substantially on the line 4—4, Fig. 3.
Figure 3:
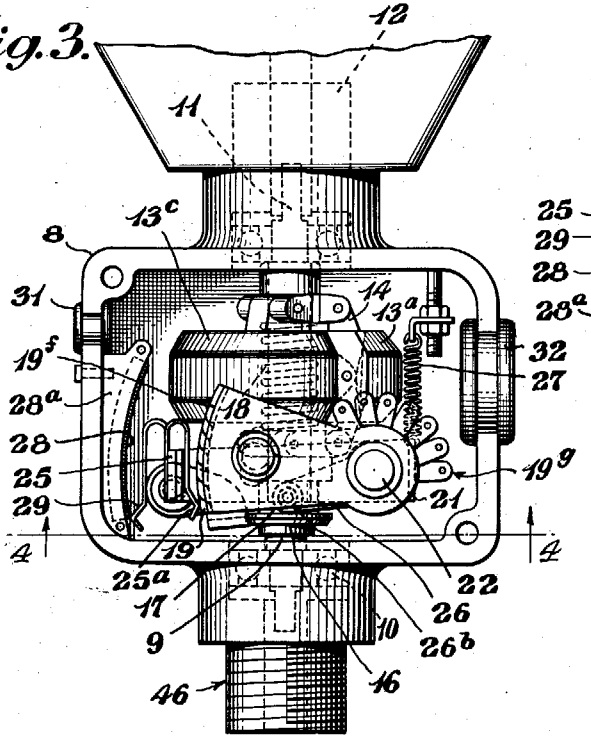
Fig. 3 is a plan view of the improved governor-switch assembly with the top of cover plate of the housing or switch box removed.

The improved governor control switch unit embodying the features of the present invention is mounted in a switch box 8 and is illustrated more or less in detail in Figs. 3 and 4.

Referring now to Figs. 3 and 4, a governor shaft 9 is mounted in bearings 10 and 10a installed at opposite ends of the switch box or housing 8, said shaft being suitably connected to the drive shaft of the motor vehicle, not shown, in any conventional manner, such as through the medium of the coupling members 11 and 12, the connection being made through the block of the motor M.

Mounted on the shaft 9 is a synchronizing governor comprising a plurality of weights 13a, 13b and 13c, each of which is pivotally connected to links 14, the said links in turn being pivotally connected at one end to collar 15 which is fixed or anchored against longitudinal movement on the shaft 9 and at their opposite ends to a sliding sleeve 16 having an annular groove 17 formed therein, the sleeve being mounted to slide longitudinally on the said shaft 9. Between the anchor member or collar 15 and the sleeve 16 is a governor spring 18.

The operation of governors of this general type is well understood in the art. As the shaft 9 revolves, the weights are caused to swing outwardly due to centrifugal force, the sliding sleeve 16 moving inwardly against the resistance of the spring 18, reduction in speed of the shaft 9 causing a reversal of movement of the sleeve 16.

The switch proper comprises a plurality of contact segments 19, 19a, 19b, 19c, 19d, 19e and 19f having dielectric or insulating material 20 therebetween, the segments and insulating material being adjustably secured to a suitable support or bracket 21 anchored to the switch box or housing 8. The contact segments 19—19f are mounted so that they may be conveniently and accurately adjusted, and with this in view, an anchor bolt 22 is passed through the one extremity of the block of segments and insulating material while at the opposite extremity the said block is anchored through the medium of an adjusting screw 23 which passes through registering clearance slots 24 formed through the block.

At their rear ends, each of the contact segments 19—19f is formed with connecting eyes 19g for accommodating wiring connections to the various speedometer and signal lights, while at their opposite ends said segments have their edges arranged in progressively stepped relation arcuately. The contact segment 19 is the common conductor segment and is connected with a lead to the battery, indicated at 19', Fig. 5, said segment having its contact edge arranged for permanent engagement by a contact member in the form of a spring brush 25a mounted on a block 25. The block 25 is secured on the end of a lever or arm 26 which is pivoted or fulcrumed on a shaft 26a constituting an extension of bolt 22 and having its inner end stationarily anchored to a boss formed on the housing 8. At its inner end, the arm 26 is provided with a roller 26b adapted to ride in the groove 17 of the sliding sleeve 16.

A spring 27 is connected at one end to the lever 26 and at its opposite end is adjustably anchored to the housing 8 through the medium of screw 27a. This spring with its exteriorly-accessible adjustment provides a convenient means for regulating the action of the governor, or of the parts controlled thereby.

It will be seen that as the shaft 9 rotates, the sleeve 16 will reciprocate longitudinally on said shaft, thereby actuating the crank or lever 26 and causing the brush 25a to wipe the contact segments 19a—19f in successive order and in accordance with the adjustment of the latter. Since the contact edge of the common conductor segment or plate 19 has an arcuate contour such as will always maintain it in contact with the brush 25a, the latter will receive current from the battery or other source of potential through this plate and transmit the current to the remaining segments as it contacts the latter. Thus plate 19 serves as a common conductor, through the brush, for the remaining segments.

A resistance unit or rheostat 28 is shown mounted in an insulating block 28a secured to the inner side wall of the casing 8. Another brush or contact spring 29 is connected to the block 25 opposite the brush 25a and is energized through contact with the latter. A wire 30, note Fig. 5, connects with the one end of the rheostat and passes through an insulating grommet 31 mounted in a housing 8. Another grommet 32 is also secured in the housing 8 to accommodate wiring from segments 19a—19f to the speedometer and signal lights. The wire 30 is shown connected to a motor in Fig. 5 which may be a drive motor for an odometer, such as illustrated in the Giles S. Moore application heretofore referred to, or may be any other electrical device. It will also be understood that the resistance unit could be substituted by another bank of contacts or the like.

As will be obvious, the contact segments may be varied in number in accordance with the number of signals to be accommodated.

The switch operates as follows, reference being made to the wiring diagram in Fig. 5 in conjunction with the remaining figures:

It will be noted that the Battery B is connected directly to the common conductor segment 19. Since the arcuate contact end or edge of the segment 19 lies in substantially the same arcuate plane as that defined by the furthermost advanced contact edges of the remaining segments, it will always be contacted by the brush 25a, and the respective contact segments 19a–19f will be energized in respective order as the brush 25a contacts the ends of the said latter segments. The governor 13 operates in accordance with the speed of the travel of the vehicle to move sleeve 16 back and forth on the shaft 9, thereby actuating lever or arm 26 and causing the brushes 25a and 29 to move back and forth in contact with the segments 19—19f and the resistance unit or rheostat 28, respectively, also in direct relation to the speed of travel of the vehicle.

Figure 3A:
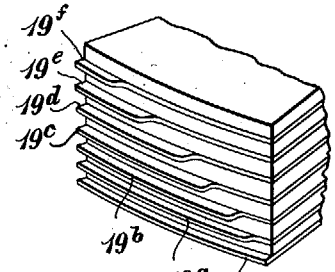
Fig. 3a is a detail perspective view of the contact edge portions of the switch plates forming part of the switch assembly.

It will be noted by observing Fig. 3a that each signal switch plate or contact member 19a—19f has its edge contact surface projected radially for continuous contact by brush 25a once contact is established, resulting in the particular signal controlled thereby remaining energized until the brush finger clears the arcuately stepped edge on the return movement of the brush.

By adjusting the contact plates 19a—19f with respect to one another and to the common conductor plate 19, definite speed responses may be obtained. This is an important feature in switches for signals of the type herein contemplated, since it tends towards accuracy and maintenance of accuracy throughout long periods of use. Also, spring tolerances or variations may be readily compensated for.

Another feature to which attention is directed is the absolute lack of "arcing" between the brush or main contact member 25a and the contact plates 19—19f and which is always present to some extent at least in switches where the contact members are of direct "make" and "break" type, or where they contact over their full area substantially simultaneously and break in the same manner. Such arcing results in burning which soon deteriorates the contacts and tends towards sticking and inaccuracy in signal response.

Figure 5:
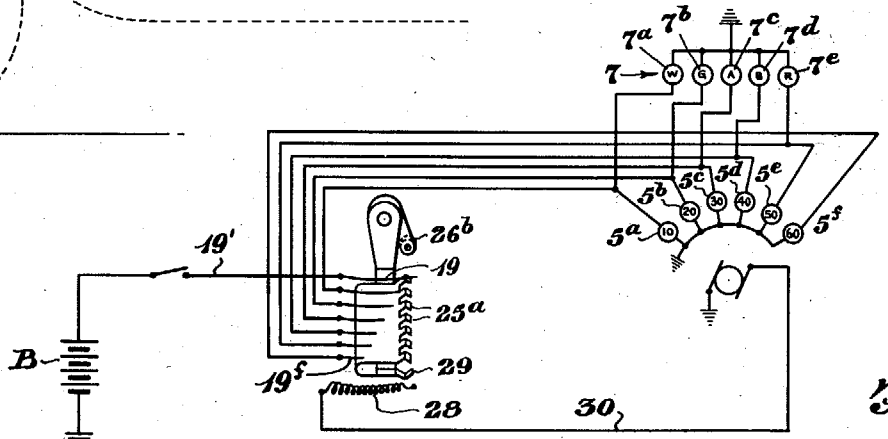
Fig. 5 is a wiring diagram for the signal circuit of Figs. 1 and 2 with the improved switch incorporated therein.

It will be observed from Figs. 4 and 5 that the brush 25a constitutes in effect a plurality of contact members which are resilient and independently movable or flexible relative to one another, so that when the brush is actuated bodily to move these contact members into engagement with the surfaces of the stepped contacts 19—19f, the contact members flex and successively engage the contacts until the switch arm moves in the reverse direction whereupon they successively disengage the said contact surfaces.

Means are provided for mechanically connecting the governor shaft 9 with the drive shaft of a speedometer, note Fig. 2.

It will be understood that certain changes in structure and design of the improved unit may be adapted generally within the scope of the invention as defined by the appended claims.

We claim:

1. In a switch unit of the type specified, a governor, a plurality of plate-like contact members having edge contact surfaces arranged in stepped relation arcuately, a switch member having a brush adapted to wipe said contact surfaces, said switch member having an operative connection with said governor to be actuated thereby, and means for relatively arcuately adjusting the individual contact members for a definite speed response.

2. In a switch unit of the type specified, in combination, a governor, a switch arm operatively connected to said governor to be actuated thereby, a bank of substantially flat contact segments clamped together flatwise and having insulation material therebetween, the contact edge portions of said segments being arranged in stepped relation arcuately, one of said segments constituting a common conductor segment and having its arcuate contact edge contoured to follow the line of contact of the remaining group of segments, and means electrically connecting said common conductor segment to a source of electrical energy.

3. In a switch unit of the type specified, a bank of substantially flat contact segments having insulation or dielectric material therebetween, the contact edges of said segments being arranged in stepped relation arcuately, and means adjustably clamping said segments in bank formation, the switch being adjusted by loosening the bank and arcuately moving said segments.

4. In a switch unit of the type specified, a governor, a switch arm operatively connected to said governor to be actuated thereby, a contact brush carried by said switch arm, a plurality of flat contact segments with insulation or dielectric material therebetween, the contact edges of said segments being arranged in stepped relation arcuately with one of said segments having its arcuate contact edge shaped to follow the arcuate contour of the entire group of segments, and means adjustably clamping said segments in bank formation.

5. A governor-controlled switch unit comprising a governor, an arcuately movable arm connected to said governor to be actuated thereby, a bank of contact segments arranged flatwise with insulation material therebetween, said segments having their contact edge portions contoured arcuately with one of said segments constituting a common conductor segment and having a contact edge describing an arc substantially equal to that defined by the contact edges of the remaining segments, and a contact brush mounted on said arm and adapted to wipe said contact edges, said brush spanning the entire width of the bank.

6. In combination, a governor-controlled switch including a spring adapted to be compressed due to centrifugal action of the governor, a switch arm operatively connected to said governor to be actuated thereby, a bank of contacts stationarily mounted with respect to said switch arm, a brush mounted on such switch arm and adapted to wipe said contacts in successive order, and means for relatively adjusting the individual contacts for a definite speed response and also to compensate for spring tolerances.

7. In a governor controlled switch, a switch arm operatively connected to the governor to be actuated thereby, a bank of individual contacts stationarily mounted with respect to said switch arm and having contact surfaces arranged in progressively stepped relation, contact members actuated by said arm to engage said contact surfaces in successive order, said contact members being resilient and independently movable relative to one another whereby when they are moved into engagement with said contact surfaces during movement of the switch arm in one direction they flex and successively engage the said surfaces and remain in contact therewith until the switch arm moves in the reverse direction whereupon they successively disengage the said contact surfaces, and means for adjusting said individual contacts with respect to one another for definite speed responses.

8. In a governor controlled switch including a spring adapted to be compressed due to centrifugal action of the governor, a switch arm operatively connected to the governor to be actuated thereby, a bank of individual contacts stationarily mounted with respect to said switch arm and having contact surfaces arranged in progressively stepped relation, resilient independently flexible contact members movable by said switch arm into successive engagement with said surfaces, and means for adjusting said individual contacts with respect to one another and also with respect to said flexible contact members for definite speed responses and also to compensate for spring tolerances.

9. In combination a governor controlled switch including a governor shaft carrying centrifugal weights and a spring mounted on said shaft and adapted to be compressed due to the action of said weights, a switch arm operatively connected to said governor to be actuated thereby, a bank of individual contacts stationarily mounted with respect to said switch arm and having progressively stepped contact surfaces, resilient independently flexible contact members movable by said switch arm into successive contact with said surfaces, and means for adjusting said individual contacts with respect to one another and also with respect to said flexible contact members for definite speed responses and also to compensate for governor spring tolerances.

10. A governor-controlled switch unit including a plurality of plate-like contacts clamped together with di-electric material therebetween and having edge contact surfaces arranged in stepped relation arcuately, a switch arm operatively connected to the governor to be actuated thereby, a brush connected to said arm and arranged to engage the edges of said contact members in successive order, the edge contact surfaces of said contact members being formed with radially projected stepped surfaces for continuous contact with said brush once contact is established, and means for relatively adjusting said contacts.

ELMER G. STRECKFUSS.
GILES S. MOORE.